US011352199B2

(12) United States Patent
Dijkstra et al.

(10) Patent No.: US 11,352,199 B2
(45) Date of Patent: Jun. 7, 2022

(54) CAPSULE, A SYSTEM FOR PREPARING A POTABLE BEVERAGE FROM SUCH A CAPSULE AND USE OF SUCH A CAPSULE IN A BEVERAGE PREPARATION DEVICE

(71) Applicant: Koninklijke Douwe Egberts B.V., Utrecht (NL)

(72) Inventors: Hielke Dijkstra, Utrecht (NL); Arend Hendrik Groothornte, Utrecht (NL); Erik Pieter van Gaasbeek, Utrecht (NL); Marc Henrikus Joseph Ottenschot, Utrecht (NL); Ralf Kamerbeek, Utrecht (NL); Armin Sjoerd Eijsackers, Utrecht (NL); John Henri Flamand, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 15/811,524

(22) Filed: Nov. 13, 2017

(65) Prior Publication Data
US 2018/0297775 A1    Oct. 18, 2018

Related U.S. Application Data

(63) Continuation of application No. PCT/NL2016/050342, filed on May 13, 2016.

(30) Foreign Application Priority Data

May 15, 2015   (NL) ................. PCT/NL2015/050349

(51) Int. Cl.
*B65D 85/804*      (2006.01)
(52) U.S. Cl.
CPC ............................... *B65D 85/8043* (2013.01)

(58) Field of Classification Search
CPC ........................ B65D 85/8043; A47J 31/3695
See application file for complete search history.

(56) References Cited

U.S. PATENT DOCUMENTS

| 4,651,538 A | 3/1987 | Bull et al. |
| 5,798,599 A | 8/1998 | Harwood |
| (Continued) | | |

FOREIGN PATENT DOCUMENTS

| AU | 2015255218 A1 | 11/2015 |
| AU | 2016253679 A1 | 11/2016 |
| (Continued) | | |

OTHER PUBLICATIONS

International Search Report and Written Opinion, PCT/NL2016/050342, Koninklijke Douwe Egberts B.V., 13 pages dated (Nov. 8, 2016).

(Continued)

*Primary Examiner* — Amber R Orlando
*Assistant Examiner* — Chaim A Smith
(74) *Attorney, Agent, or Firm* — Fitch, Even, Tabin & Flannery LLP

(57) ABSTRACT

A capsule containing a substance for the preparation of a potable beverage. The capsule comprises an aluminum capsule body having a side wall and an outwardly extending flange and a sealing member at the outwardly extending flange for providing a fluid sealing contact with an enclosing member of a beverage preparation device. The beverage preparation device comprises an annular element having a free contact end which is provided with a plurality of radially extending open grooves. The capsule comprises a bearing for the enclosing member of the beverage preparation device if the capsule is positioned in the enclosing member of the beverage preparation device and the enclosing member is closed by means of a closing member of the (Continued)

beverage preparation device, said bearing enclosing at least a portion of the free contact end of the annular element.

38 Claims, 5 Drawing Sheets

(56) References Cited

U.S. PATENT DOCUMENTS

| | | |
|---|---|---|
| 5,897,899 A | 4/1999 | Fond |
| 8,176,714 B2 | 5/2012 | Abegglen |
| 2001/0048178 A1 | 12/2001 | Jud |
| 2005/0061705 A1 | 3/2005 | Spallek et al. |
| 2005/0084695 A1 | 4/2005 | Shirane |
| 2006/0110507 A1 | 5/2006 | Yoakim |
| 2007/0202237 A1 | 8/2007 | Yoakim |
| 2009/0017177 A1 | 1/2009 | Yoakim et al. |
| 2009/0223373 A1 | 9/2009 | Kollep |
| 2009/0280219 A1 | 11/2009 | Yoakim |
| 2009/0320692 A1 | 12/2009 | Simanski |
| 2010/0015307 A1 | 1/2010 | Abegglen et al. |
| 2010/0178404 A1 | 7/2010 | Yoakim et al. |
| 2011/0000917 A1 | 1/2011 | Wolters et al. |
| 2011/0020500 A1 | 1/2011 | Eichler et al. |
| 2011/0041702 A1 | 2/2011 | Yoakim |
| 2011/0185910 A1 | 8/2011 | Ryser |
| 2011/0185911 A1 | 8/2011 | Rapparini |
| 2011/0200725 A1 | 8/2011 | Kollep |
| 2011/0259204 A1 | 10/2011 | Kaeser et al. |
| 2011/0315021 A1 | 12/2011 | Eichler |
| 2012/0031794 A1* | 2/2012 | Ozanne .............. B65B 29/022 206/459.5 |
| 2012/0225168 A1 | 9/2012 | Kamerbeek |
| 2012/0231123 A1 | 9/2012 | Kamerbeek |
| 2012/0251694 A1 | 10/2012 | Kamerbeek et al. |
| 2013/0099597 A1 | 4/2013 | Perentes et al. |
| 2013/0180408 A1 | 7/2013 | Eichler et al. |
| 2013/0224341 A1 | 8/2013 | Bendavid |
| 2013/0259982 A1 | 10/2013 | Abegglen |
| 2013/0340478 A1 | 12/2013 | Miyoshi et al. |
| 2014/0170271 A1 | 6/2014 | Zweed et al. |
| 2014/0178537 A1 | 6/2014 | Zweed et al. |
| 2014/0328983 A1 | 11/2014 | Jarisch et al. |
| 2015/0033947 A1 | 2/2015 | Van Der Kamp et al. |
| 2015/0151903 A1 | 6/2015 | Bartoli et al. |
| 2015/0223632 A1 | 8/2015 | Hall |
| 2016/0037961 A1 | 2/2016 | Digiuni |
| 2016/0075506 A1 | 3/2016 | Chapman |
| 2016/0159563 A1 | 6/2016 | Bartoli et al. |
| 2016/0353918 A1 | 12/2016 | Talon |
| 2016/0362246 A1 | 12/2016 | Garcin et al. |
| 2016/0362247 A1 | 12/2016 | Bartoli et al. |
| 2017/0158422 A1 | 6/2017 | Andreae et al. |
| 2017/0325619 A1 | 11/2017 | Holten et al. |
| 2018/0257856 A1 | 9/2018 | Oliver |
| 2018/0273286 A1 | 9/2018 | Dijkstra |
| 2018/0289201 A1 | 10/2018 | Dijkstra |
| 2018/0290824 A1 | 10/2018 | Dijkstra |
| 2018/0290825 A1 | 10/2018 | Dijkstra |
| 2018/0297775 A1 | 10/2018 | Dijkstra |
| 2018/0297776 A1 | 10/2018 | Dijkstra |
| 2019/0077588 A1 | 3/2019 | Bartel |
| 2019/0177078 A1 | 6/2019 | Dijkstra |
| 2020/0047986 A1 | 2/2020 | Kamerbeek |
| 2020/0047987 A1 | 2/2020 | Kamerbeek |

FOREIGN PATENT DOCUMENTS

| | | |
|---|---|---|
| AU | 2017219060 A1 | 9/2017 |
| CA | 2901582 A1 | 11/2014 |
| CN | 105188488 | 12/2015 |
| DE | 10 2008 014 758 A1 | 10/2009 |
| DE | 20 2009 009 125 U1 | 10/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 11/2015 |
| DE | 202016106171 U1 | 1/2017 |
| EP | 0 468 079 | 1/1992 |
| EP | 0 844 195 B1 | 5/1998 |
| EP | 1 165 398 B1 | 12/2002 |
| EP | 1 190 959 B1 | 3/2004 |
| EP | 1 654 966 B1 | 5/2006 |
| EP | 1 700 548 | 9/2006 |
| EP | 1 700 584 A1 | 9/2006 |
| EP | 1700548 B1 | 9/2006 |
| EP | 1 299 022 B1 | 2/2007 |
| EP | 1 339 305 B1 | 4/2007 |
| EP | 1 646 305 B1 | 9/2007 |
| EP | 1 849 715 B1 | 10/2007 |
| EP | 1 882 431 B1 | 1/2008 |
| EP | 1 892 199 A1 | 2/2008 |
| EP | 1 839 543 B1 | 6/2008 |
| EP | 1 859 712 B1 | 1/2009 |
| EP | 1 859 714 B1 | 2/2009 |
| EP | 2 070 828 B1 | 6/2009 |
| EP | 1 816 934 B1 | 11/2009 |
| EP | 1 967 099 B1 | 1/2010 |
| EP | 1 900 653 B1 | 3/2010 |
| EP | 2 029 457 B1 | 3/2010 |
| EP | 1 882 432 B1 | 7/2010 |
| EP | 2 230 195 A1 | 9/2010 |
| EP | 2 142 054 B1 | 1/2011 |
| EP | 2 068 684 B1 | 2/2011 |
| EP | 2 289 820 B1 | 3/2011 |
| EP | 2 308 776 A1 | 4/2011 |
| EP | 2 205 133 B1 | 6/2011 |
| EP | 2 284 100 B1 | 6/2011 |
| EP | 2 284 101 B1 | 9/2011 |
| EP | 2 364 930 A2 | 9/2011 |
| EP | 2 151 313 B1 | 10/2011 |
| EP | 2 229 082 B1 | 12/2011 |
| EP | 2 012 994 B1 | 7/2012 |
| EP | 2 385 922 B1 | 8/2012 |
| EP | 2 489 609 A1 | 8/2012 |
| EP | 2 374 383 B1 | 11/2012 |
| EP | 2 573 008 A1 | 3/2013 |
| EP | 2 631 198 A1 | 8/2013 |
| EP | 2 631 199 A1 | 8/2013 |
| EP | 2 512 302 B1 | 9/2013 |
| EP | 2 682 028 A1 | 1/2014 |
| EP | 2 690 035 A1 | 1/2014 |
| EP | 2 712 824 A1 | 4/2014 |
| EP | 2 757 056 A1 | 7/2014 |
| EP | 2 516 296 A1 | 8/2014 |
| EP | 2 801 538 A1 | 11/2014 |
| EP | 2 334 564 B1 | 3/2015 |
| EP | 2 868 598 A1 | 5/2015 |
| EP | 3 023 360 B1 | 1/2018 |
| ES | 1137034 U | 3/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2 503 774 B | 6/2015 |
| GB | 2 523 775 A | 9/2015 |
| WO | 2006045515 | 5/2006 |
| WO | WO-2006/045536 A1 | 5/2006 |
| WO | WO-2007/122206 A1 | 11/2007 |
| WO | WO-2008/037642 A1 | 4/2008 |
| WO | WO-2009/115474 A1 | 9/2009 |
| WO | WO-2009/128016 A1 | 10/2009 |
| WO | WO-2010/055465 A1 | 5/2010 |
| WO | WO-2010/084475 A2 | 7/2010 |
| WO | WO-2010/115970 A1 | 10/2010 |
| WO | WO-2010/116284 A2 | 10/2010 |
| WO | WO-2010/128844 A1 | 11/2010 |
| WO | 2010137946 | 12/2010 |
| WO | WO-2010/137952 A1 | 12/2010 |
| WO | WO-2011/000005 A1 | 1/2011 |
| WO | WO-2011/010263 A1 | 1/2011 |
| WO | 2011092301 | 8/2011 |
| WO | WO-2011/113854 A2 | 9/2011 |

(56) References Cited

FOREIGN PATENT DOCUMENTS

| | | |
|---|---|---|
| WO | WO-2012/011053 A1 | 1/2012 |
| WO | WO-2012/013556 A1 | 2/2012 |
| WO | WO-2012/038063 A1 | 3/2012 |
| WO | WO-2012/045184 A1 | 4/2012 |
| WO | 2012100836 | 8/2012 |
| WO | WO-2012/110323 A1 | 8/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | WO-2012/144885 A1 | 10/2012 |
| WO | WO-2013/043048 A1 | 3/2013 |
| WO | WO-2013/046014 A1 | 4/2013 |
| WO | WO-2013/053655 A1 | 4/2013 |
| WO | WO-2013/060654 A1 | 5/2013 |
| WO | WO-2013/060918 A1 | 5/2013 |
| WO | WO-2013/068242 A1 | 5/2013 |
| WO | WO-2013/079811 A1 | 6/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | WO-2013/144838 A1 | 10/2013 |
| WO | WO-2013/153169 A2 | 10/2013 |
| WO | WO-2013/157924 A1 | 10/2013 |
| WO | WO-2013/157927 A1 | 10/2013 |
| WO | WO-2013/164669 A1 | 11/2013 |
| WO | WO-2013/189923 A1 | 12/2013 |
| WO | WO-2013/190426 A1 | 12/2013 |
| WO | WO-2014/001584 A1 | 1/2014 |
| WO | WO-2014/012779 A2 | 1/2014 |
| WO | WO-2014/012783 A2 | 1/2014 |
| WO | WO-2014/033344 A1 | 3/2014 |
| WO | WO-2014/053638 A1 | 4/2014 |
| WO | WO-2014/067507 A2 | 5/2014 |
| WO | WO-2014/072942 A2 | 5/2014 |
| WO | WO-2014/076041 A1 | 5/2014 |
| WO | WO-2014/118812 A1 | 8/2014 |
| WO | WO-2014/125390 A1 | 8/2014 |
| WO | WO-2014/128315 A1 | 8/2014 |
| WO | WO-2014/167526 A1 | 10/2014 |
| WO | WO-2014/184651 A1 | 11/2014 |
| WO | WO-2014/184652 A1 | 11/2014 |
| WO | WO-2014/184653 A1 | 11/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | WO-2015/011683 A1 | 1/2015 |
| WO | WO-2015/056202 A1 | 4/2015 |
| WO | WO-2015/075584 A1 | 5/2015 |
| WO | WO-2015/082982 A1 | 6/2015 |
| WO | WO-2015/087180 A1 | 6/2015 |
| WO | WO-2015/101394 A1 | 7/2015 |
| WO | WO-2015/104171 A1 | 7/2015 |
| WO | WO-2015/104172 A1 | 7/2015 |
| WO | WO-2015/128527 A1 | 9/2015 |
| WO | WO-2015/128799 A1 | 9/2015 |
| WO | WO-2015/128827 A1 | 9/2015 |
| WO | WO-2015/180960 A1 | 12/2015 |
| WO | WO-2016/041596 A1 | 3/2016 |
| WO | 2016186489 A1 | 11/2016 |
| WO | WO-2016/186488 A1 | 11/2016 |
| WO | WO-2016/186491 A1 | 11/2016 |
| WO | WO-2016/186492 A1 | 11/2016 |
| WO | WO-2016/186496 A1 | 11/2016 |
| WO | 2017074189 A1 | 5/2017 |
| WO | WO-2016/074189 A1 | 5/2017 |

OTHER PUBLICATIONS

Nullity Action on DE 202016106171.7, 96 pages (Dec. 20, 2019).
International Preliminary Report on Patentability, PCT/NL2016/050341, Koninklijke Douwe Egberts B.V., 8 pages dated (Nov. 21, 2017).
International Preliminary Report on Patentability, PCT/NL2016/050344, Koninklijke Douwe Egberts B.V., 8 pages dated (Nov. 21, 2017).
International Preliminary Report on Patentability, PCT/NL2016/050346, Koninklijke Douwe Egberts B.V., 7 pages dated (Nov. 21, 2017).
International Preliminary Report on Patentability, PCT/NL2016/050350, Koninklijke Douwe Egberts B.V., 8 pages dated (Nov. 21, 2017).
International Preliminary Report on Patentability, PCT/NL2016/050749, Koninklijke Douwe Egberts B.V., 7 pages dated (May 1, 2018).
International Preliminary Report on Patentability, PCT/NL2016/050342, Koninklijke Douwe Egberts B.V., 8 pages dated (Nov. 21, 2017).
Notice of Opposition, dated Jan. 24, 2020 for EP Application No. 16744560.0, 41 pages.
"Nespresso", Wikipedia Archive, published Nov. 29, 2012, 8 pages.
U.S. Appl. No. 15/811,525, filed Nov. 13, 2017, Koninklijke Douwe Egberts B.V.
U.S. Appl. No. 15/811,528, filed Nov. 13, 2017, Koninklijke Douwe Egberts B.V.
U.S. Appl. No. 15/813,049, filed Nov. 14, 2017, Koninklijke Douwe Egberts B.V.
U.S. Appl. No. 15/813,054, filed Nov. 14, 2017, Koninklijke Douwe Egberts B.V.
U.S. Appl. No. 15/963,258, filed Apr. 26, 2018, Koninklijke Douwe Egberts B.V.
International Search Report and Written Opinion, PCT/NL2016/050341, Koninklijke Douwe Egberts B.V., 13 pages dated (Oct. 27, 2016).
International Search Report and Written Opinion, PCT/NL2016/050344, Koninklijke Douwe Egberts B.V., 13 pages dated (Oct. 27, 2016).
International Search Report and Written Opinion, PCT/NL2016/050346, Koninklijke Douwe Egberts B.V., 12 pages dated (Nov. 10, 2016).
International Search Report and Written Opinion, PCT/NL2016/050350, Koninklijke Douwe Egberts B.V., 13 pages dated (Nov. 2, 2016).
International Search Report and Written Opinion, PCT/NL2016/050749, Koninklijke Douwe Egberts B.V., 10 pages dated (Feb. 22, 2017).
International Preliminary Report on Patentability, PCT/NL2016/050349, 7 pages dated (Nov. 21, 2017).
International Preliminary Report on Patentability, PCT/NL2017/050663, 7 pages dated (Apr. 9, 2019).
International Search Report and Written Opinion, PCT/NL2017/050300, 13 pages dated (Jul. 19, 2017).
International Search Report and Written Opinion, PCT/NL2017/050301, 15 pages dated (Jul. 19, 2017).
International Search Report and Written Opinion, PCT/NL2017/050659, 12 pages dated (Jan. 17, 2018).
International Search Report and Written Opinion, PCT/NL2017/050663, 12 pages dated (Jan. 17, 2018).
International Search Report and Written Opinion, PCT/NL2018/050486, 14 pages dated (Oct. 18, 2018).

\* cited by examiner

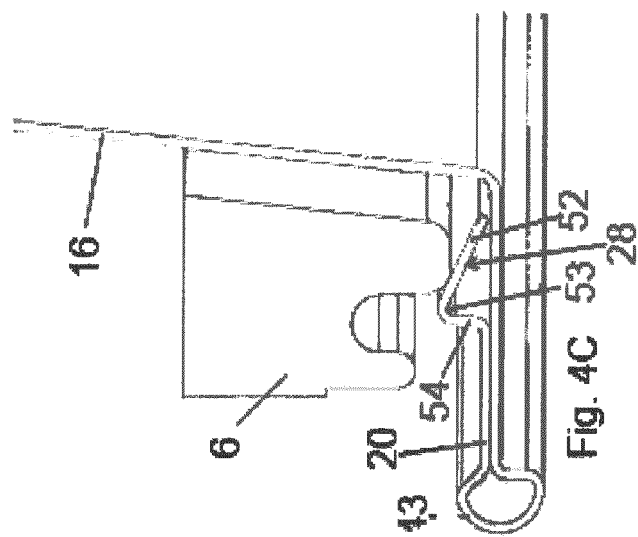
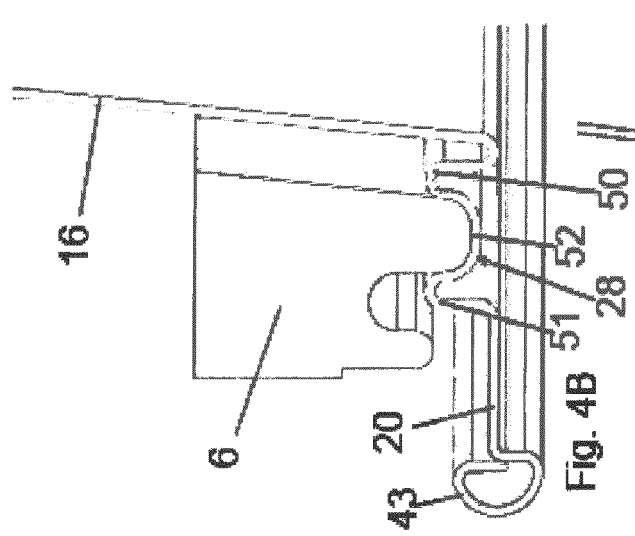
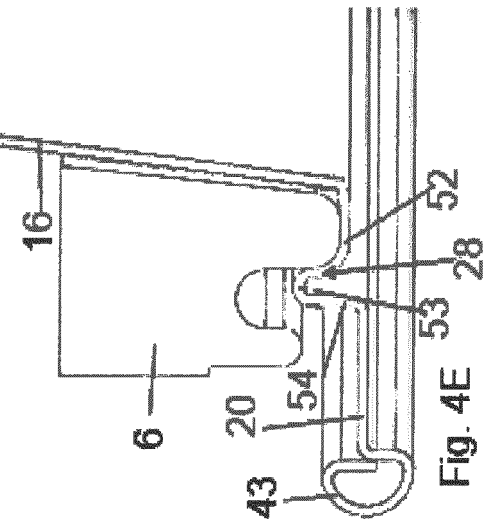
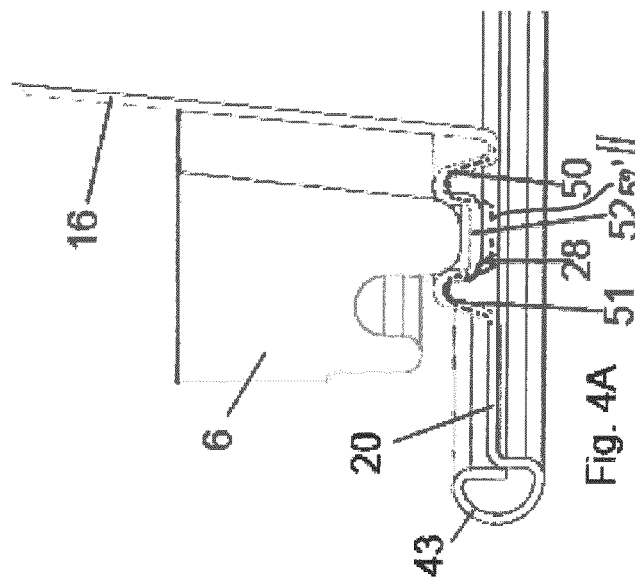
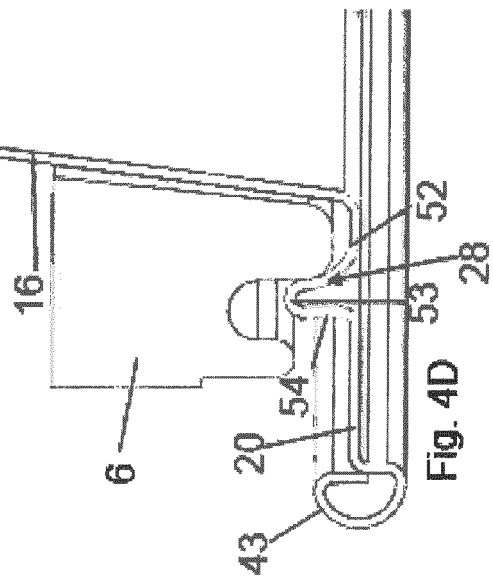

CAPSULE, A SYSTEM FOR PREPARING A POTABLE BEVERAGE FROM SUCH A CAPSULE AND USE OF SUCH A CAPSULE IN A BEVERAGE PREPARATION DEVICE

CROSS-REFERENCE TO RELATED APPLICATIONS

This application is a continuation of International Application Number PCT/NL2016/050342 filed May 13, 2016, which claims the benefit of and priority to International Application Number PCT/NL2015/050349 filed May 15, 2015. The entire contents of all of which are hereby incorporated herein by reference.

BACKGROUND AND SUMMARY

The invention relates to a capsule containing a substance for the preparation of a potable beverage by extracting and/or dissolving the substance by means of supplying a fluid under pressure into the capsule, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, said free contact end of the annular element optionally being provided with a plurality of radially extending open grooves.

The invention also relates to a system for preparing a potable beverage from a capsule using a fluid supplied under pressure into the capsule comprising:
  a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves;
  a capsule containing a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Furthermore the invention relates to the use of a capsule in a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves; wherein the capsule contains a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Such a capsule, system and use are known from EP-B-1 700 548. In the known system the capsule is provided with a sealing member having the shape of a step, i.e. a sudden increase of the diameter of the side wall of the capsule, and the enclosing member of this known system has a sealing surface acting on the sealing member to provide deflection of the sealing member, the sealing surface being inclined so that the deflection of the sealing member is an inwards and downwards deformation of the step. Furthermore in the known system the enclosing member comprises a capsule holder and a manually operated or an automatic mechanism for relative displacement of the enclosing member and the capsule holder. The manually operated or automatic mechanism applies a force on the sealing member of the capsule when the enclosing member closes on the capsule holder. This force should ensure the fluid tight seal between the enclosing member and the capsule. Because the manually operated or automatic mechanism is arranged to be moved relative to the base, the sealing capabilities of the system can depend on the pressure of the fluid injected by the fluid injection means. If the pressure of the fluid increases, the force between the sealing member of the capsule and the free end of the enclosing member increases too and thereby the force between the sealing member of the capsule and the free end of the enclosing member increases also. Such a system is described further on. The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or automatic mechanism moves the enclosing member towards the capsule holder. Only if there is a sufficient initial sealing, the pressure in the enclosing member will increase whereby also the force of the free end of the enclosing member acting on the sealing member of the capsule will increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design. It should be able to provide a fluid sealing contact between the enclosing member and the capsule at a relatively low fluid pressure if only a relatively small force is applied on the sealing member by means of the free end of the enclosing member but it should also provide a fluid sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

It is an object of the invention to provide an alternative sealing member which is relatively easy to manufacture, which is environmentally friendly if the capsule is disposed of after use and/or which provide a satisfactory sealing even in case of an enclosing member of which the free contact end is provided with radially extending open grooves.

The invention has also as an object to provide an alternative system for preparing a potable beverage from a capsule and to provide an alternative use of a capsule in a beverage preparation device.

In accordance with the invention there is provided in a first aspect a capsule containing a substance for the preparation of a potable beverage by extracting and/or dissolving the substance by means of supplying a fluid under pressure into the capsule, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, said free contact end of the annular element optionally being provided with a plurality of radially extending open grooves, characterized in that, the capsule comprises a bearing for the enclosing member of the beverage preparation device if the capsule is positioned in the enclosing member of the beverage preparation device and the enclosing member is closed by means of a closing member of the beverage preparation device, said bearing enclosing at least a portion of the free contact end of the annular element wherein prior to use at least a first portion of the bearing lays at a first height above the cover wherein, in use, upon closing of the enclosing member by means of the closing member the at least one first portion of the bearing is lowered by means of the free contact end of the annular element being moved towards the closing element wherein the bearing is at least partly folded over the free contact end of the annular element so that after closing of the enclosing member by means of the closing member the at least one first portion of the bearing lays at a second height above the cover wherein the first height is larger than the second height and the second height may be zero. Since the bearing encloses at least a portion of the free contact end of the annular element if the capsule is positioned in the enclosing member of the beverage preparation device and the enclosing member is closed by means of a closing member of the beverage preparation device a satisfactory sealing can be obtained. Such a bearing can be relatively easy to manufacture. Furthermore the capsule can provide a satisfactory sealing with the free contact end provided with radially extending open grooves. Because upon closing of the enclosing member the bearing is at least partly folded over the free contact end of the annular element an excellent sealing engagement between capsule and enclosing member is obtained. In this application the existence of a fluid sealing contact means that 0-6%, preferably 0-4%, more preferably 0-2.5% of the total fluid supplied to the enclosing member for preparing the beverage may leak away due to leakage between the free contact end and the sealing member of the capsule.

The invention is in particular advantageous when, in an embodiment of a capsule, the capsule is filled with 5-20 grams, preferably 5-10 grams, more preferably 5-7 grams of an extractable product, such as roasted and ground coffee.

In an embodiment of a capsule according to the invention which is in particular easy to manufacture the outer diameter of the outwardly extending flange of the capsule is larger than the diameter of the bottom of the capsule. Preferably, the outer diameter of the outwardly extending flange is approximately 37.1 mm and the diameter of the bottom of the capsule is about 23.3 mm.

The invention is in particular advantageous when in an embodiment of a capsule the thickness of the aluminum capsule body is 20 to 120 micrometer, preferably 100 micrometer.

The invention is in particular advantageous when in an embodiment of a capsule the thickness of the aluminum cover is 15 to 65 micrometer, preferably 30-45 micrometer and more preferably 39 micrometer.

In an embodiment of a capsule according to the invention the wall thickness of the aluminum cover is smaller than the wall thickness of the aluminum capsule body.

In a further embodiment of a capsule according to the invention the aluminum cover is arranged to tear open on a closing member of the beverage preparation device, such as an extraction plate of the beverage preparation device under the influence of fluid pressure in the capsule.

In an embodiment of a capsule according to the invention which is in particular easy to manufacture the side wall of the aluminum capsule body has a free end opposite the bottom, the outwardly extending flange extending from said free end of the side wall in a direction at least substantially transverse to the central capsule body axis. Preferably, the outwardly extending flange comprises a curled outer edge, which is beneficial in obtaining for a satisfactory sealing with the free contact end provided with radially extending open grooves. The radius about the central capsule body axis of an inner edge of the curled outer edge of the outwardly extending flange is preferably at least 32 mm, so that clearance from the annular end surface of the enclosure member is ensured. It is then preferred that the sealing member is positioned between the free end of the side wall of the aluminum capsule body and an inner edge of the curled outer edge of the outwardly extending flange to obtain a still further satisfactory sealing.

To ensure that the curled outer edge does not interfere with operation of a wide variety of commercially available and future beverage preparation apparatuses, the outwardly extending flange has a largest radial cross-sectional dimension of about 1.2 millimeter.

The invention is in particular beneficial for capsules of which the inner diameter of the free end of the side wall of the aluminum capsule body is about 29.5 mm. The distance between the free end of the side wall of the aluminum capsule body and an outermost edge of the outwardly extending flange can be about 3.8 millimeter. The preferred height of the aluminum capsule body is about 28.4 mm.

In an embodiment of a capsule according to the invention which after use is easier for a user to take out of a beverage preparation device the aluminum capsule body is truncated, wherein preferably the side wall of the aluminum capsule body encloses an angle with a line transverse to the central capsule body axis of about 97.5°.

In an advantageous embodiment of a capsule according to the invention the bottom of the aluminum capsule body has a largest inner diameter of about 23.3 mm. It is preferred that the bottom of the aluminum capsule body is truncated, preferably having a bottom height of about 4.0 mm and that the bottom further has a generally flat central portion opposite the cover having a diameter of about 8.3 mm.

In practically all cases a satisfactory seal can be obtained in an embodiment of a capsule according to the invention in which the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

In a preferred embodiment of a capsule according to the invention the capsule comprises an inner surface, and wherein on the inner surface of at least the side wall of the capsule an inner coating is provided. In particular when the capsule is manufactured by deep drawing the inner coating facilitates the deep drawing process. In case the aluminum cover of the capsule is attached to the outwardly extending flange by means of a sealing lacquer it is then in particular advantageous when said inner coating being composed of the same material as the sealing lacquer. In dependence of the inner coating used it is preferred that the sealing member is free from an inner coating in order to prevent crumbling off of the inner coating from the sealing member.

In a further embodiment of a capsule according to the invention the capsule comprises an outer surface, wherein on the outer surface of the capsule a color lacquer is provided. In order to facilitate in deep drawing it is preferred to provide on an outer surface of the color lacquer an outer coating. In dependence of the color lacquer and outer coating used it is preferred that the sealing member is free from a color lacquer (and consequently the outer coating) in order to prevent crumbling off of the color lacquer/outer coating from the sealing member.

In an embodiment of a capsule according to the invention which is east to manufacture the bearing enclosing at least a portion of the free contact end of the annular element is at least partly formed by the sealing member.

Preferably the sealing member of the capsule then comprises two spaced projections, each projecting from the outwardly extending flange and a plateau between the two projections so that the at least one first portion of the plateau defines a predetermined depth of a space between the two projections, wherein the radial distance between the two projections is such that the free contact end of the annular element is enclosed by the two projections if the capsule is positioned in the enclosing member of the beverage preparation device and the enclosing member is closed by means of a closing member of the beverage preparation device and wherein prior to use the at least one first portion of the plateau lays at a first height above the cover so that the space has a first depth wherein, in use, upon closing of the enclosing member by means of the closing member the at least one first portion of the plateau is lowered by means of the free contact end of the annular element being moved towards the closing element so that the plateau is at least partly folded over the free contact end wherein after closing of the enclosing member by means of the closing member, the at least one first portion of the plateau lays at a second height above the cover wherein the first height is larger than the second height and the second height may be zero and so that the space has a second depth relative to the at least one first portion which is larger than the first depth. Because upon closing of the enclosing member the plateau is at least partly folded over the free contact end of the annular element an excellent sealing engagement between capsule and enclosing member is obtained. Also the fact that the depth of said space is increased so that a relative large portion of the annular element is positioned in the space improves the sealing engagement between the capsule and the enclosing member.

It is then also advantageous when the distance between the two projections is such that the free contact end of the annular element is contacted by the two projections if the capsule is positioned in the enclosing member of the beverage preparation device and the enclosing member is closed by means of a closing member of the beverage preparation device. The two spaced projections and the plateau can be arranged such that the free contact end of the annular element is contacted by the plateau if the capsule is positioned in the enclosing member of the beverage preparation device and the enclosing member is closed by means of a closing member of the beverage preparation device.

Alternatively the sealing member of the capsule then comprises a projection projecting from the outwardly extending flange and a plateau between the projection and the side wall of the aluminum capsule body, wherein the bearing is formed by the projection, the plateau and the side wall of the aluminum capsule body, wherein the distance between the projection and the side wall is such that the free contact end of the annular element is enclosed by the projection and the side wall of the aluminum capsule body if the capsule is positioned in the enclosing member of the beverage preparation device and the enclosing member is closed by means of a closing member of the beverage preparation device wherein prior to use at least one first portion of the plateau lays at a first height above the cover, wherein, in use, upon closing of the enclosing member by means of the closing member the at least one first portion of the plateau is lowered by means of the free contact end of the annular element being moved towards the closing element so that the plateau is at least partly folded over the free contact end wherein after closing of the enclosing member by means of the closing member, the at least one first portion of the plateau lays at a second height above the cover wherein the first height is larger than the second height and the second height may be zero. Because upon closing of the enclosing member the plateau is at least partly folded over the free contact end of the annular element an excellent sealing engagement between capsule and enclosing member is obtained.

The distance between the projection and the side wall of the aluminum capsule body can then be such that the free contact end of the annular element is contacted by the projection and the side wall of the aluminum capsule body if the capsule is positioned in the enclosing member of the beverage preparation device and the enclosing member is closed by means of a closing member of the beverage preparation device. Preferably the projection, the side wall of the aluminum capsule body and the plateau are then arranged such that the free contact end of the annular element is contacted by the plateau if the capsule is positioned in the enclosing member of the beverage preparation device and the enclosing member is closed by means of a closing member of the beverage preparation device.

In a further embodiment of the capsule according to the invention in which the sealing can be improved further, at least one projection comprises a projection top, and wherein the at least one projection is configured such that its projection top exerts a radial force on the free contact end of the annular element if the capsule is positioned in the enclosing member of the beverage preparation device and the enclosing member is closed by means of a closing member of the beverage preparation device. In particular when the plateau is substantially flat and is inclined with regard to the outwardly extending flange of the aluminum capsule body the exerted force provides an additional sealing effect.

In a still further embodiment of a capsule according to the invention at least one projection comprises projection side wall which is inclined with regard to the outwardly extending flange of the aluminum capsule body.

The plateau is substantially flat or can comprise a curved portion, preferably adapted to the shape of the free contact end of the annular element.

In accordance with the invention there is provided in a second aspect a system for preparing a potable beverage from a capsule using a fluid supplied under pressure into the capsule comprising:

a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves;

a capsule containing a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device, characterized in that, the capsule comprises a bearing for the enclosing member of the beverage preparation device if the capsule is positioned in the enclosing member of the beverage preparation device and the enclosing member is closed by means of a closing member of the beverage preparation device, said bearing enclosing at least a portion of the free contact end of the annular element. Since the bearing encloses at least a portion of the free contact end of the annular element if the capsule is positioned in the enclosing member of the beverage preparation device and the enclosing member is closed by means of a closing member of the beverage preparation device a satisfactory sealing can be obtained. Such a bearing can be relatively easy to manufacture. Furthermore in such a system the capsule provides a satisfactory sealing with the free contact end provided with the radially extending open grooves.

Regarding the preferred embodiments of the system as mentioned in the dependent claims which relate to the same features as the features of the dependent claims of the capsule reference is made to the above.

The invention is particularly suitable in a system according to the invention wherein, in use, the maximum fluid pressure in the enclosing member of the beverage preparation device is in the range of 6-20 bar, preferably between 12 and 18 bar. Even at this high pressures a satisfactory seal between capsule and beverage preparation device can be obtained.

Preferably the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar. In particular the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably in the range of 40-150 N, more preferably 50-100 N, when the fluid pressure P1 in the enclosing member of the beverage preparation device outside the capsule is in the range of 0.1-4 bar, preferably between 0.1-1 bar.

In an embodiment of a system according to the invention wherein the plurality of radially extending open grooves are uniformly spaced relative to each other in tangential direction of the free contact end of the annular element of the beverage preparation device so that it is easier for a user to take out the capsule while a satisfactory seal between capsule and beverage preparation device can still be provided.

In an advantageous embodiment of a system according to the invention the longest tangential width of each groove (top to top, i.e. equal to the groove to groove pitch) is 0.9-1.1 mm, preferably 0.95 to 1.05 mm, more preferably 0.98 to 1.02 mm, wherein a maximal height of each groove in an axial direction of the enclosing member of the beverage preparation device is 0.01-0.09 mm, preferably 0.03 to 0.07 mm, more preferably 0.045 to 0.055 mm, most preferred 0.05 mm and wherein the number of grooves is 90 to 110, preferably 96. The radial width of the annular end surface at the location of the grooves may for instance be 0.05-0.9 mm, preferably 0.2-0.7 mm and more preferably 0.3-0.55 mm.

The invention is in particular suitable when applied to an embodiment of a system according to the invention in which during use when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device. The enclosing member may comprise a first part and a second part wherein the second part comprises the free contact end of the enclosing member wherein the second part can move relative to the first part between a first and second position. The second part can move from the first position towards the second position in the direction of the closing member under the influence of fluid pressure in the enclosing member. The force F1 as discussed above may be reached if the second part is in the first position with a fluid pressure P1. The force F2 as discussed above may be reached if the second part is moved towards the second position under the influence of the fluid pressure P2 in the enclosing member.

In accordance with the invention there is provided in a third aspect a use of a capsule according to the invention in a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radial grooves; wherein the capsule contains a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device. Regarding the advantage of the inventive use and the preferred embodiments of the use as mentioned in the dependent claims which relate to the same features as the features of the dependent claims of the capsule or the dependent claims of the system reference is made to the above.

BRIEF DESCRIPTION OF THE DRAWINGS

The invention will now be further elucidated by means of, non-limiting, examples referring to the drawing, in which

FIG. 4A shows a first embodiment of a sealing member at the outwardly extending flange of a capsule according to the invention;

FIG. 4B shows a second embodiment of a sealing member at the outwardly extending flange of a capsule according to the invention;

FIG. 4C shows a third embodiment of a sealing member at the outwardly extending flange of a capsule according to the invention;

FIG. 4D shows a fourth embodiment of a sealing member at the outwardly extending flange of a capsule according to the invention; and FIG. 4E shows a fifth embodiment of a sealing member at the outwardly extending flange of a capsule according to the invention.

In the Figures and the following description, like reference numerals refer to like features.

DETAILED DESCRIPTION

Figure 1:
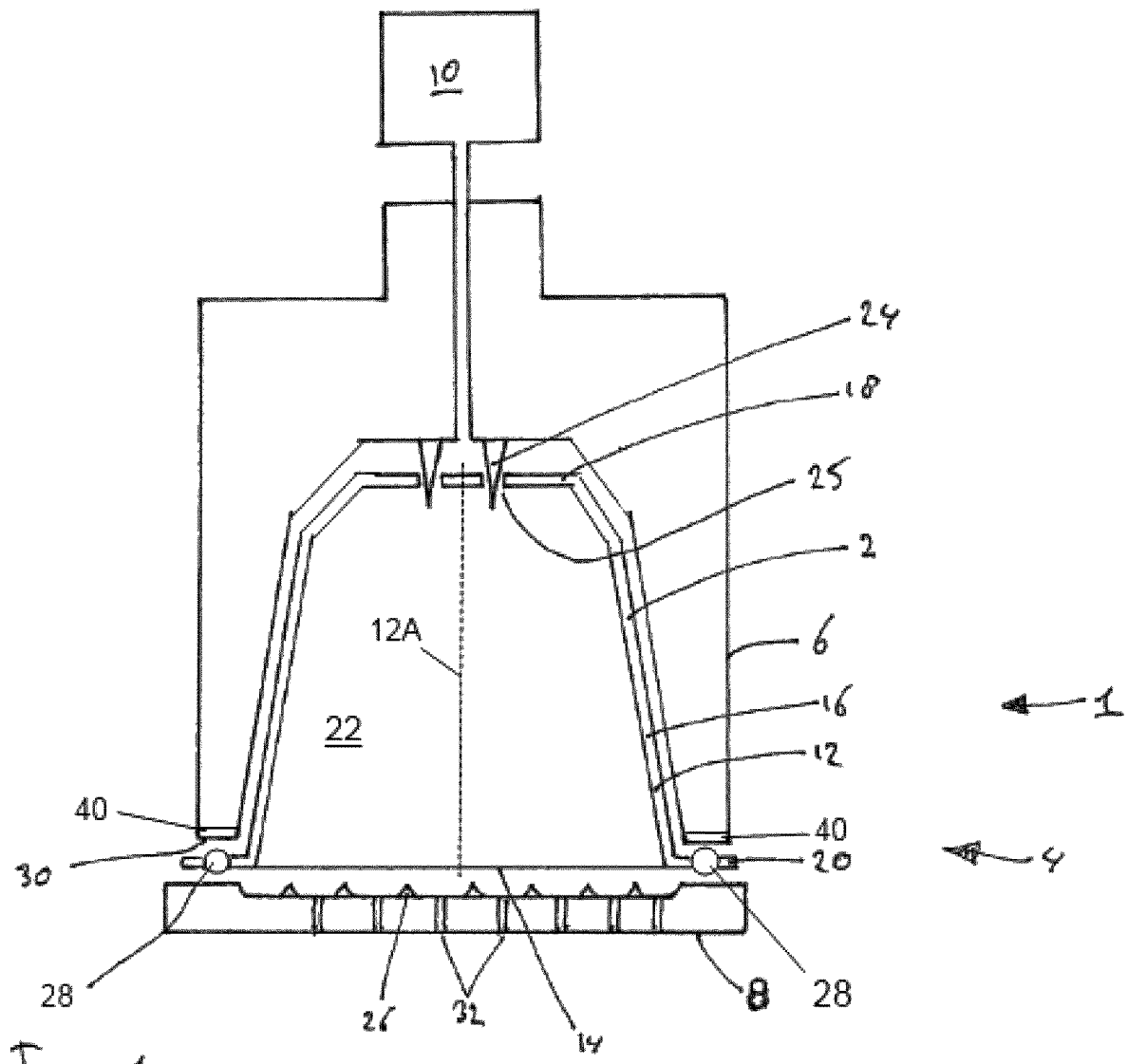
FIG. 1 shows a schematic representation of an embodiment of a system according to the invention.

FIG. 1 shows a schematic representation, in cross sectional view, of an embodiment of a system 1 for preparing a potable beverage from a capsule using a fluid supplied under pressure into the capsule. The system 1 comprises a capsule 2, and a beverage preparation device 4. The device 4 comprises enclosing member 6 for holding the capsule 2. The device 4 further comprises a closing member, such as an extraction plate, 8 for supporting the capsule 2.

In FIG. 1 a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The apparatus 4 further comprises a fluid injection means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover 14. In the present context, the meaning of 'aluminum' is understood to also include aluminum alloy. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is 5-20 grams, preferably 5-10 grams, more preferably 5-7 grams of roasted and ground coffee for the preparation of a single beverage. The capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

Figure 3A:
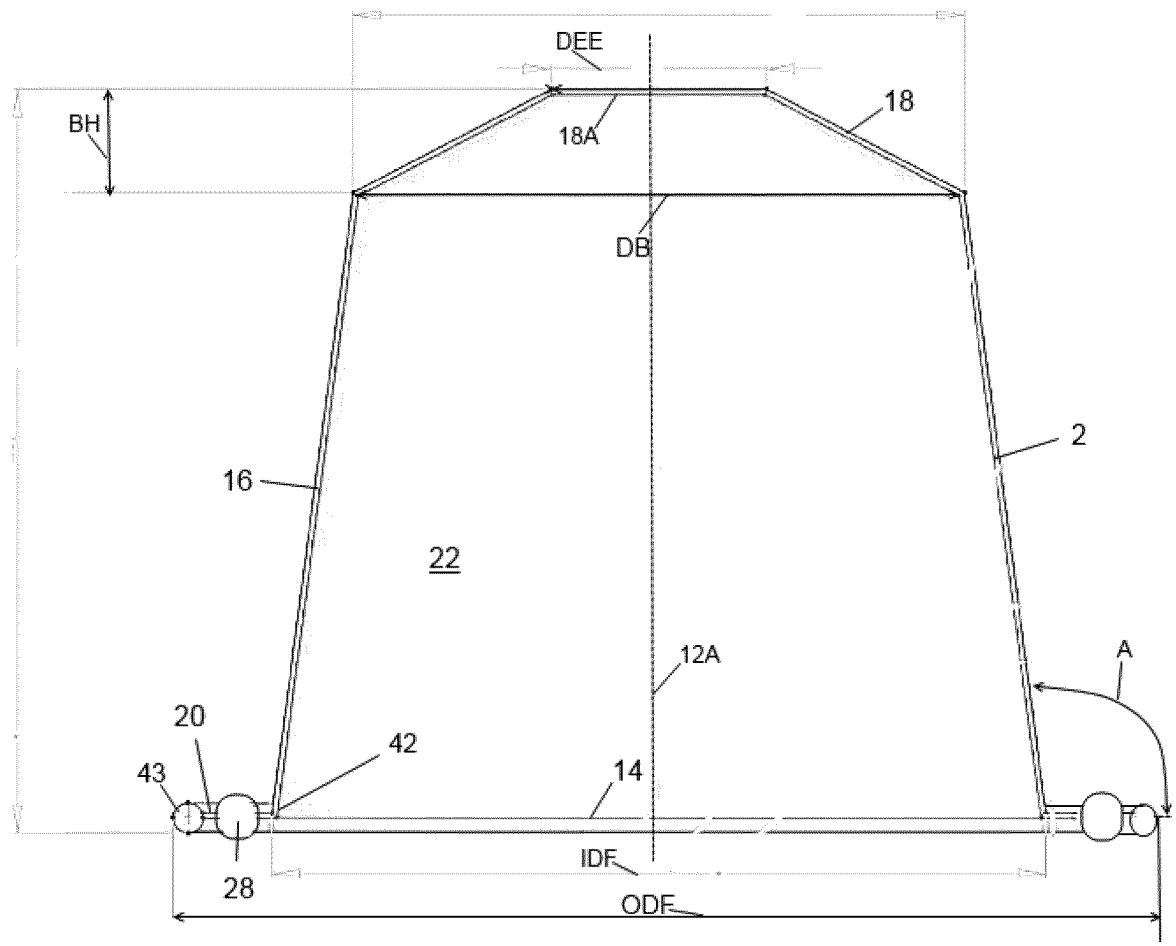
FIG. 3A in cross section shows an embodiment of a capsule according to the invention before use.
Figure 3B:
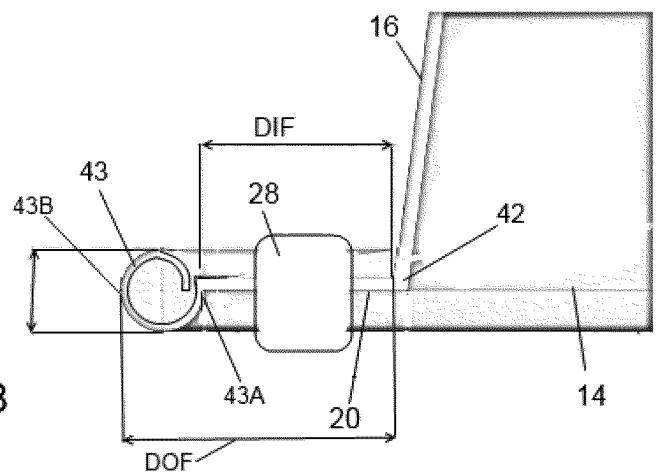
FIG. 3B shows an enlarged detail of the capsule of FIG. 3A showing the outwardly extending flange and the sealing member.

The capsule 2 further comprises a sealing member 28, in FIGS. 1, 3A and 3B indicated as a general box but more detailed described with regard to FIGS. 4A-4E, which sealing member 28 is arranged at the outwardly extending flange 20 for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing member 28 are sealingly engaged between the enclosing member 6 and the extraction plate 8. This means that a fluid sealing contact between the sealing member and the free contact end is established.

Figure 2:
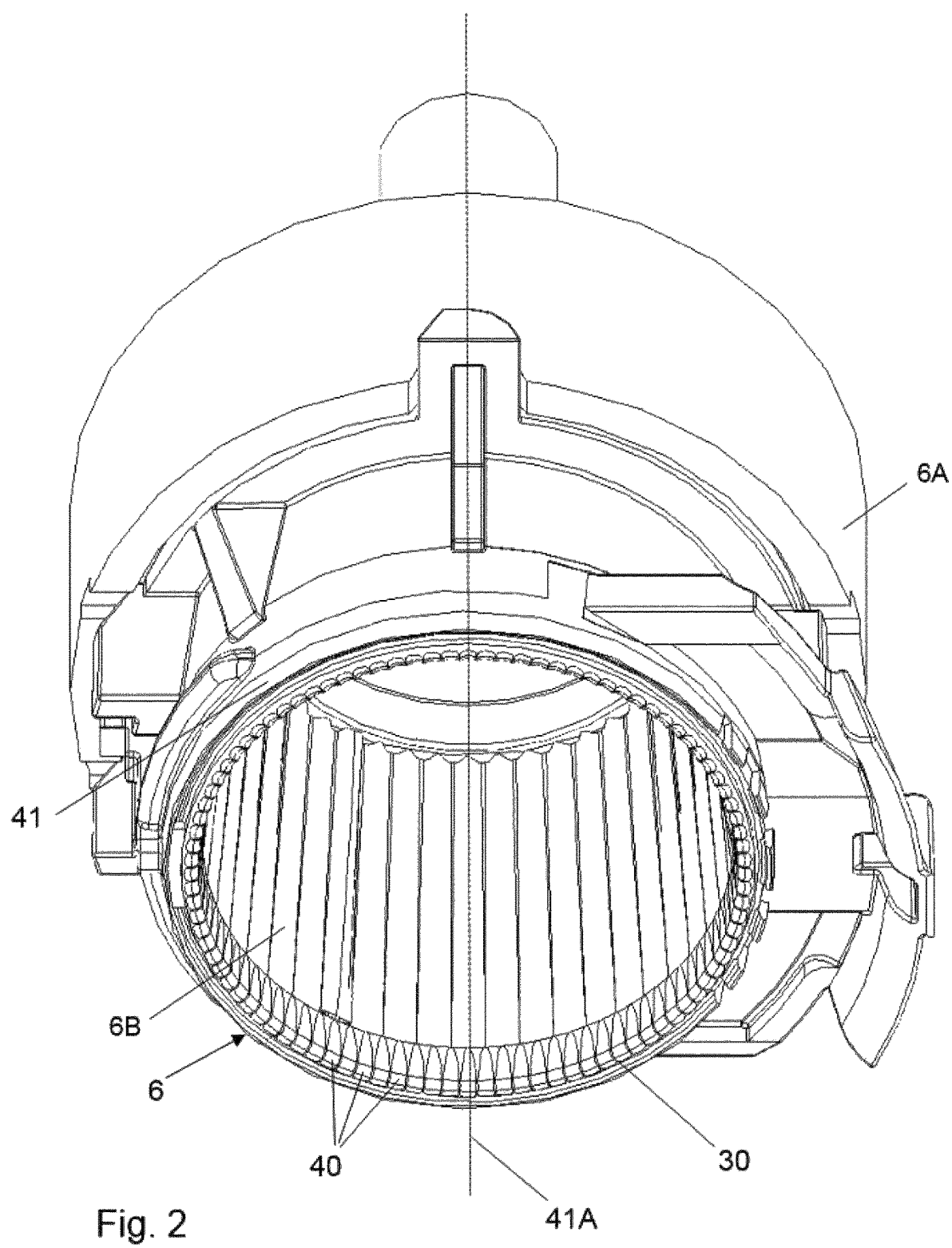
FIG. 2 in a perspective view shows an embodiment of a beverage preparation device of a system according to the invention showing the free contact end of the enclosing member of the beverage preparation device with the plurality of radially extending open grooves.

As shown in FIG. 2 the enclosing member 6 of the beverage preparation device comprises an annular element 41 having a central annular element axis 41A and a free contact end 30. The free contact end 30 of the annular element 41 is provided with a plurality of radially extending open grooves 40. The plurality of radially extending open grooves 40 are uniformly spaced relative to each other in tangential direction of the free contact end 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. Usually, the radial width of the free end at the location of the grooves is 0.05-0.9 mm, more specifically 0.2-0.7 mm, more specifically 0.3-0.55 mm.

An embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. The thickness of the aluminum capsule body 12 is 100 micrometer, but in other embodiments the thickness can be 20 to 120 micrometer.

In the shown embodiment, the wall thickness of the aluminum cover 14 is 39 micrometer. The wall thickness of the aluminum cover 14 is preferably smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter. The radius about the central capsule body axis of the inner edge 43A of the curled outer edge 43 is preferably at least 32 mm.

As shown in FIGS. 3A and 3B the sealing member 28 is positioned between the free end of the side wall 16 of the aluminum capsule body 12 and the inner edge 43A of the curled outer edge 42 of the outwardly extending flange. The sealing member 28 is indicated as a general box, but will be described in more detail below. Irrespective of the embodiment of the sealing member 28 the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has an largest inner diameter DB of about 23.3 mm. The bottom 18 of the aluminum capsule body 12 is also truncated, and in the shown embodiment has a bottom height BH of about 4.0 mm. The bottom 18 further has an a generally flat central portion 18A opposite the cover 14, which central portion 18A has a diameter DEE of about 8.3 mm and in which central portion 18A the entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of potable beverage, in the present example coffee, the substance in the capsule being roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate. Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free end 30 of the enclosing member 6 exerts a force F1 on the sealing member 28 of the capsule 2 to provide a fluid sealing contact between the outwardly extending flange 20 of the capsule 2 and the enclosing member 6 of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar. During brewing, the free end 30 of the enclosing member 6 exerts a force F2 on the sealing member 28 of the capsule 2 to provide a fluid sealing contact between the outwardly extending flange 20 of the capsule 2 and the enclosing member 6, wherein the force F2 is in the range of 500-1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment the free contact end of enclosing member 6 can move relative to the extracting plate 8 under the effect of the pressure of the fluid in the enclosing member 6 device towards the extraction plate 8 for applying the maximum force F2 between the outwardly extending flange 20 and the free end 30 of the enclosing member 6. This movement can take place during use, i.e. in particular at the start of brewing and during brewing. The enclosing member 6 has a first part 6A and a second part 6B wherein the second part comprises the free contact end 30. The second part 6B can move relative to the first part 6A between a first and second position. The second part 6B can move from the first position towards the second position in the direction of the closing member 8 under the influence of fluid pressure in the enclosing member 6. The force F1 as discussed above may be reached if the second part 6B is in the first position with a fluid pressure P1. The force F2 as discussed above may be reached if the second part 6B is moved towards the second position under the influence of the fluid pressure P2 in the enclosing member 6.

Figure 3C:
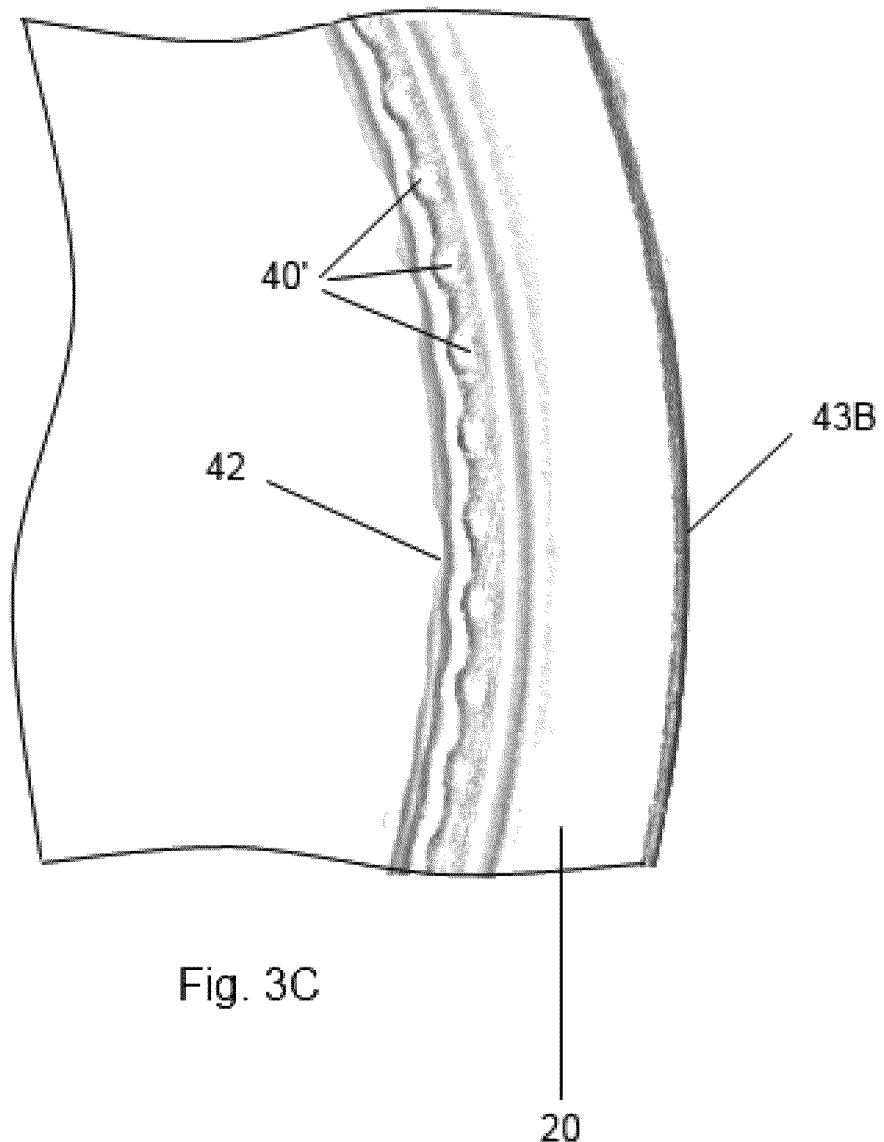
FIG. 3C shows an enlarged detail of the outwardly extending flange of the capsule in FIGS. 3A and 3B after use.

As a result of the force applied the sealing member 28 of the capsule according to the invention undergoes a plastic deformation and closely conforms to the grooves 40 of the free contact end 30 and thus provides a fluid sealing contact between the enclosing member 6 and the capsule 3 at a relatively low fluid pressure during start up of brewing but also provides a fluid sealing contact at the much higher fluid pressure in the enclosing member outside the capsule during brewing. This close conformation to the grooves 40 of the enclosing member is indicated in FIG. 3C which shows the capsule 2 of the invention after use, and which clearly indicates that the outwardly extending flange 20 comprises deformations 40' which conform to the grooves 40 of the enclosing member.

Now exemplary embodiments of a sealing member 28 at the outwardly extending flange 20 of the capsule 2 according to the invention will be described in more detail with regard to FIGS. 4A to 4E.

FIG. 4A shows a first embodiment of a sealing member 28 forming a bearing at the outwardly extending flange 20 of a capsule 2 according to the invention. The sealing member 28 comprises two spaced projections 50 and 51, each projecting from the outwardly extending flange 20. A plateau 52 is present between the two projections 50 and 51. The distance between the two projections 50 and 51 is such that the free contact end of the annular element 6 is enclosed by the two projections 50 and 51 if the capsule is positioned in the enclosing member of the beverage preparation device and the enclosing member is closed by means of a closing member of the beverage preparation device. In the embodiment shown in FIG. 4A the plateau is positioned at a distance above the portion of the outwardly extending flange 20 between the sealing member 28 and the curled edge 43 and is substantially flat. The distance between the two projections 50 and 51 (e.g. 0.9-1.25 mm) is further such that the free contact end of the annular element is contacted by the two projections 50 and 52 if the capsule is positioned in the enclosing member of the beverage preparation device and the enclosing member is closed by means of a closing member of the beverage preparation device. Further, the two spaced projections 50, 51 and the plateau 52 are arranged such that the free contact end of the annular element is contacted by the plateau if the capsule is positioned in the enclosing member of the beverage preparation device and the enclosing member is closed by means of a closing member of the beverage preparation device. At least one first portion of the plateau (in this example the whole plateau) defines a predetermined depth of a space between the two projections. As can be seen in FIG. 4A each projection 50, 51 comprises a projection side wall which is inclined with regard to the outwardly extending flange 20 of the aluminum capsule body. It thus holds that the sealing member comprises two spaced projections 50, 51, each projecting from the outwardly extending flange 20 and a plateau 52 between the two projections so that at least one first portion of the plateau (in this example the whole plateau) defines a predetermined depth of a space between the two projections. The radial distance between the two projections is such that the free contact end of the annular element is enclosed by the two projections if the capsule is positioned in the enclosing member of the beverage preparation device and the enclosing member is closed by means of a closing member of the beverage preparation device. Prior to use (see FIG. 4A) the at least one first portion of the plateau (in this example the whole plateau) lays at a first height above the cover so that the space has a first depth wherein, in use, upon closing of the enclosing member by means of the closing member at least one first portion of the plateau is lowered by means of the free contact end of the annular element being moved towards the closing element so that the plateau is at least partly folded over the free contact end wherein after closing of the enclosing member by means of the closing member the at least one first portion of the plateau lays at a second height above the cover (position 52') wherein the first height is larger than the second height and the second height may be zero and so that the space has a second depth relative to the at least one first portion which is larger than the first depth.

FIG. 4B shows a second embodiment of a sealing member 28 at the outwardly extending flange 20 of a capsule according to the invention. When compared with FIG. 4A the following differences are noted. Each projection 50, 51 now comprises projection side wall which is transverse with regard to the outwardly extending flange 20 of the aluminum capsule body. Further, in this second embodiment the plateau 52 is curved, preferably conforming to the shape of the free contact end of the annular element 6. It thus holds that the sealing member comprises two spaced projections 50, 51, each projecting from the outwardly extending flange 20 and a plateau 52 between the two projections so that at least one first portion of the plateau (in this example the middle of the plateau) defines a predetermined depth of a space between the two projections. The radial distance between the two projections is such that the free contact end of the annular element is enclosed by the two projections if the capsule is positioned in the enclosing member of the beverage preparation device and the enclosing member is closed by means of a closing member of the beverage preparation device. Prior to use (see FIG. 4B) the at least one first portion of the plateau (in this example the middle of the plateau) lays at a first height above the cover so that the space has a first depth wherein, in use, upon closing of the enclosing member by means of the closing member at least one first portion of the plateau is lowered by means of the free contact end of the annular element being moved towards the closing element so that the plateau is at least partly folded over the free contact end wherein after closing of the enclosing member by means of the closing member the at least one first portion of the plateau lays at a second height above the cover wherein the first height is larger than the second height and the second height may be zero and so that the space has a second depth relative to the at least one first portion which is larger than the first depth.

FIG. 4C shows a third embodiment of a sealing member 28 at the outwardly extending flange 20 of a capsule according to the invention, which together with the side wall 16 of the aluminum capsule body forms a bearing for the enclosing member. The shown sealing member 28 comprises a projection 53 projecting from the outwardly extending flange 20 and an inclined, substantially flat plateau 52 between the top of the projection 53 and the side wall 16 of the aluminum capsule body. In this embodiment the bearing is formed by the projection 53, the plateau 52 and the side wall 16 of the aluminum capsule body. The distance between the top of the projection 53 and the side wall 16 is such that the free contact end of the annular element 6 is enclosed by the projection 53 and the side wall 16 of the aluminum capsule body if the capsule is positioned in the enclosing member of the beverage preparation device and the enclosing member is closed by means of a closing member of the beverage preparation device. In particular the distance between the projection 53 and the side wall 16 of the aluminum capsule body is such that the free contact end of the annular element 6 is contacted by the projection 53 and the side wall 16 and in the shown embodiment also the plateau 52 of the aluminum capsule body if the capsule is positioned in the enclosing member of the beverage preparation device and the enclosing member is closed by means of a closing member of the beverage preparation device. This distance may for instance be 0.9-1.25 mm. It holds thus that prior to use (see FIG. 4C) at least one first portion of the plateau (in this example at least a portion in the middle of the plateau) lays at a first height above the cover. In use, upon closing of the enclosing member by means of the closing member the at least one first portion of the plateau is lowered by means of the free contact end of the annular element being moved towards the closing element so that the plateau is at least partly folded over the free contact end. After closing of the enclosing member by means of the closing member, the at least one first portion of the plateau lays at a second height above the cover wherein the first height is larger than the second height and the second height may be zero.

FIG. 4D shows a fourth embodiment of a sealing member 28 at the outwardly extending flange 20 of a capsule according to the invention, which, together with the side wall 16 of the aluminum capsule body, forms a bearing for the enclosing member. When compared with FIG. 4C the following differences are noted. In this fourth embodiment the plateau 52 is curved, and comprises a curved portion (which forms in fact a portion of the inner sidewall of the projection 53) and also a flat portion which is situated at the same level as the portion of the outwardly extending flange 20 between the projection 53 and the curved edge 43. The curved portion preferably conforms to the shape of the free contact end of the annular element 6. It holds thus that prior to use (see FIG. 4D) at least one first portion of the plateau (in this example at least a portion of the inner sidewall of the projection 53) lays at a first height above the cover. In use, upon closing of the enclosing member by means of the closing member the at least one first portion of the plateau is lowered by means of the free contact end of the annular element being moved towards the closing element so that the plateau is at least partly folded over the free contact end. After closing of the enclosing member by means of the closing member, the at least one first portion of the plateau lays at a second height above the cover wherein the first height is larger than the second height and the second height may be zero. FIG. 4E shows a fifth embodiment of a sealing member 28 at the outwardly extending flange 20 of a capsule according to the invention, which, together with the side wall 16 of the aluminum capsule body, forms a bearing for the enclosing member. When compared with FIG. 4D the following difference is noted. In this fifth embodiment the flat portion of the plateau 52 is situated at a distance above the portion of the outwardly extending flange 20 between the projection 53 and the curved edge 43. It holds thus that prior (see FIG. 4E) to use at least one first portion of the plateau (in this example at least a portion of the inner sidewall of the projection 53) lays at a first height above the cover. In use, upon closing of the enclosing member by means of the closing member the at least one first portion of the plateau is lowered by means of the free contact end of the annular element being moved towards the closing element so that the plateau is at least partly folded over the free contact end. After closing of the enclosing member by means of the closing member, the at least one first portion of the plateau lays at a second height above the cover wherein the first height is larger than the second height and the second height may be zero.

In the embodiments shown in FIGS. 4C to 4E the projection 53 comprises an outer projection side wall 54 which is transverse to the portion of the outwardly extending flange between the projection 53 and the curled edge 43, but in other embodiments this outer projection side wall 54 can be inclined with regard to said portion of the outwardly extending flange 20.

In all the embodiments shown in FIGS. 4A to 4E each of the projections comprises a projection top. In preferred embodiments at least one projection but preferably all projections forming the bearing is/are configured such that its projection top exerts a radial force on the free contact end of the annular element 6 if the capsule is positioned in the enclosing member of the beverage preparation device and the enclosing member is closed by means of a closing member of the beverage preparation device. Also for each of the embodiments shown in FIGS. 4A to 4E it holds that prior to use at least a first portion of the bearing lays at a first height above the cover wherein, in use, upon closing of the enclosing member by means of the closing member the at least one first portion of the bearing is lowered by means of the free contact end of the annular element being moved towards the closing element wherein the bearing is at least partly folded over the free contact end of the annular element so that after closing of the enclosing member by means of the closing member the at least one first portion of the bearing lays at a second height above the cover wherein the first height is larger than the second height and the second height may be zero.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:

1. A capsule containing a substance for the preparation of a potable beverage by extracting and/or dissolving the substance by supplying a fluid under pressure into the capsule, the capsule comprising:
   an aluminum capsule body having a central capsule body axis, said aluminum capsule body being provided with a bottom, a side wall and an outwardly extending flange;
   an aluminum cover attached to the outwardly extending flange, the cover hermetically closing the capsule;
   a sealing member at the outwardly extending flange for providing a fluid sealing contact with an enclosing member of a beverage preparation device if the capsule is positioned in the enclosing member of the beverage preparation device and the enclosing member is closed by a closing member of the beverage preparation device such that the outwardly extending flange of the capsule and at least a portion of the sealing member of the capsule are sealingly engaged between the enclosing member and the closing member of the beverage preparation device;
   wherein the enclosing member of the beverage preparation device comprises an annular element having a central annular element axis and a free contact end, said free contact end of the annular element optionally being provided with a plurality of radially extending open grooves;
   wherein the sealing member forms a bearing for the enclosing member of the beverage preparation device if the capsule is positioned in the enclosing member of the beverage preparation device and the enclosing member is closed by the closing member of the beverage preparation device, said bearing enclosing at least a portion of the free contact end of the annular element;
   wherein prior to use at least one first portion of the bearing lays at a first height above the cover and above a portion of the outwardly extending flange radially outward from the sealing member;
   wherein, in use, upon closing of the enclosing member by the closing member the at least one first portion of the bearing is lowered by the free contact end of the annular element being moved towards the closing member wherein the bearing is at least partly folded over the free contact end of the annular element so that after closing of the enclosing member by the closing member, the at least one first portion of the bearing lays at a second height above the cover wherein the first height is larger than the second height and the second height may be zero,
   wherein the sealing member comprises two spaced projections, each projecting from the outwardly extending flange and a depression spanning uninterruptedly between the two projections so that at least one first portion of the depression defines a predetermined depth of a space between the two projections, wherein the radial distance between the two projections is such that the free contact end of the annular element is enclosed by the two projections if the capsule is positioned in the enclosing member of the beverage preparation device and the enclosing member is closed by a closing member of the beverage preparation device and wherein prior to use the at least one first portion of the depression lays at a first height above the cover so that the space has a first depth; and
   wherein the aluminum capsule body is made of aluminum plate material and the sealing member and the remainder of the aluminum capsule body is made of said same aluminum plate material.

2. The capsule according to claim 1, wherein the capsule is filled with 5-20 grams or 5-10 grams or 5-7 grams of an extractable product.

3. The capsule according to claim 1, wherein the outer diameter of the outwardly extending flange of the capsule is larger than the diameter of the bottom of the capsule.

4. The capsule according to claim 3, wherein the outer diameter of the outwardly extending flange is approximately 37.1 mm and the diameter of the bottom of the capsule is about 23.3 mm.

5. The capsule according to claim 1, wherein the thickness of the aluminum capsule body is 20 to 120 micrometer or 100 micrometer.

6. The capsule according to claim 1, wherein the thickness of the aluminum cover is 15 to 65 micrometer or 30-45 micrometer or 39 micrometer.

7. The capsule according to claim 1, wherein the wall thickness of the aluminum cover is smaller than the wall thickness of the aluminum capsule body.

8. The capsule according to claim 1, wherein the aluminum cover is arranged to tear open on the closing member of the beverage preparation device under the influence of fluid pressure in the capsule.

9. The capsule according to claim 1, wherein the side wall of the aluminum capsule body has a free end opposite the bottom, the outwardly extending flange extending from said free end of the side wall in a direction at least substantially transverse to the central capsule body axis.

10. The capsule according to claim 9, wherein the outwardly extending flange comprises a curled outer edge.

11. The capsule according to claim 10, wherein an inner edge of the curled outer edge of the outwardly extending flange has a radius about the central capsule body axis of at least 32 mm.

12. The capsule according to claim 10, wherein the sealing member is positioned between the free end of the side wall of the aluminum capsule body and an inner edge of the curled outer edge of the outwardly extending flange.

13. The capsule according to claim 10, wherein the curled outer edge of the outwardly extending flange has a largest radial cross-sectional dimension of about 1.2 millimeter.

14. The capsule according to claim 9, wherein the inner diameter of the free end of the side wall of the aluminum capsule body is about 29.5 mm.

15. The capsule according to claim 9, wherein the distance between the free end of the side wall of the aluminum capsule body and an outermost edge of the outwardly extending flange is about 3.8 millimeter.

16. The capsule according to claim 1, wherein a height of the aluminum capsule body is about 28.4 mm.

17. The capsule according to claim 1, wherein the aluminum capsule body is truncated, or wherein the aluminum capsule body is truncated and the side wall of the aluminum capsule body encloses an angle with a line transverse to the central capsule body axis of about 97.5°.

18. The capsule according to claim 1, wherein the bottom of the aluminum capsule body has an largest inner diameter of about 23.3 mm.

19. The capsule according to claim 18, wherein the bottom of the aluminum capsule body is truncated, or wherein the aluminum capsule body is truncated and has a bottom height of about 4.0 mm and wherein the bottom further has an generally flat central portion opposite the cover having a diameter of about 8.3 mm.

20. The capsule according to claim 1, wherein the height of the sealing member portion to be contacted first by the free end of the enclosure member when the enclosure member is closed is at least 0.1 mm or at least 0.2 mm or at least 0.8 mm and at most 3 mm or at most 2 mm or at most 1.2 mm.

21. The capsule according to claim 1, wherein the capsule comprises an inner surface, and wherein on the inner surface of at least the side wall of the capsule an inner coating is provided.

22. The capsule according to claim 21, wherein the aluminum cover of the capsule is attached to the outwardly extending flange by a sealing lacquer, said inner coating being composed of the same material as the sealing lacquer.

23. The capsule according to claim 21, wherein the sealing member is free from an inner coating.

24. The capsule according to claim 1, wherein the capsule comprises an outer surface, and wherein on the outer surface of the capsule a color lacquer is provided.

25. The capsule according to claim 24, wherein on an outer surface of the color lacquer an outer coating is provided.

26. The capsule according to claim 24, wherein the sealing member is free from a color lacquer.

27. The capsule according to claim 1, wherein, in use, upon closing of the enclosing member by the closing member the at least one first portion of the depression is lowered by the free contact end of the annular element being moved towards the closing element so that the depression is at least partly folded over the free contact end wherein after closing of the enclosing member by the closing member, the at least one first portion of the depression lays at a second height above the cover wherein the first height is larger than the second height and the second height may be zero and so that the space has a second depth relative to the at least one first portion which is larger than the first depth.

28. The capsule according to claim 1, wherein the distance between the two projections is such that the free contact end of the annular element is contacted by the two projections if the capsule is positioned in the enclosing member of the beverage preparation device and the enclosing member is closed by a closing member of the beverage preparation device.

29. The capsule according to claim 1, wherein the two spaced projections and the depression are arranged such that the free contact end of the annular element is contacted by the depression if the capsule is positioned in the enclosing member of the beverage preparation device and the enclosing member is closed by a closing member of the beverage preparation device.

30. The capsule according to claim 1, wherein at least one of the two projections comprises a projection top, and wherein the at least one of the two projections is configured such that its projection top exerts a radial force on the free contact end of the annular element if the capsule is positioned in the enclosing member of the beverage preparation device and the enclosing member is closed by the closing member of the beverage preparation device.

31. The capsule according to claim 1, wherein at least one of the two projections comprises a projection side wall which is inclined with regard to the outwardly extending flange of the aluminum capsule body.

32. The capsule according to claim 1, wherein the depression is flat.

33. The capsule according to claim 1, wherein the depression comprises a curved portion.

34. The capsule according to claim 1, wherein the sealing member is deformable such that said bearing encloses at least a portion of the free contact end of the annular element in a fluid sealingly manner if, in use, the maximum fluid pressure in the enclosing member of the beverage preparation device is in the range of 6-20 bar or between 12 and 18 bar.

35. The capsule according to claim 1, wherein the sealing member is deformable such that said bearing encloses at least a portion of the free contact end of the annular element in a fluid sealingly manner if, during brewing, said free contact end of the annular element exerts a force F2 on the sealing member of the capsule, wherein F2 is in the range of 500-1500 N preferably in the range of 750-1250 N when the fluid pressure P2 in said enclosing member outside the capsule is in the range of 6-20 bar or between 12 and 18 bar.

36. The capsule according to claim 1, wherein the sealing member is deformable such that said bearing encloses at least a portion of the free contact end of the annular element in a fluid sealingly manner if, in use, prior to or at the start of brewing, said free contact end of the annular element exerts a force F1 on the sealing member of the capsule, wherein the force F1 is in the range of 30-150 N or 40-150 N or 50-100N, when the fluid pressure P1 in the enclosing member of the beverage preparation device outside the capsule is in the range of 0.1-4 bar or 0.1-1 bar.

37. The capsule according to claim 1, wherein the sealing member is deformable such that said bearing encloses at least a portion of the free contact end of the annular element in a fluid sealingly manner if the free contact end of the annular element that is pressed against the sealing member has a plurality of radially extending open grooves uniformly spaced relative to each other in circumferential sense of said free contact end of the annular element.

38. The capsule according to claim 1, wherein the sealing member is deformable such that said bearing sealingly encloses at least a portion of the free contact end of the annular element if the greatest width of each of said grooves is 0.9-1.1 mm or 0.95 to 1.05 mm or 0.98 to 1.02 mm wherein a maximal height of each of said grooves in an axial direction of the enclosing member of the beverage preparation device is 0.01-0.09 mm or 0.03 to 0.07 mm or 0.045 to 0.055 mm, or 0.05 mm and wherein the number of said grooves is 90 to 110 or 96.

* * * * *